United States Patent [19]

Meyers et al.

[11] 4,010,365
[45] Mar. 1, 1977

[54] SELF-STABILIZING IMAGE SCANNER

[75] Inventors: Franklin J. Meyers, Canoga Park; Gino R. Sturiale, Woodland Hills, both of Calif.

[73] Assignee: Hughes Aircraft Company, Culver City, Calif.

[22] Filed: Mar. 26, 1973

[21] Appl. No.: 346,523

[52] U.S. Cl. .............................. 250/236; 244/3.16; 250/334; 350/7
[51] Int. Cl.² .......................................... G01J 1/00
[58] Field of Search ............ 350/6, 16, 7; 250/332, 250/338, 336, 334, 236; 356/4, 5; 244/3.16

[56]  References Cited
UNITED STATES PATENTS

| | | | |
|---|---|---|---|
| 3,287,497 | 11/1966 | Back | 250/238 |
| 3,353,022 | 11/1967 | Schwartz | 250/238 |
| 3,401,599 | 9/1968 | Schonherr et al. | 350/16 |
| 3,486,026 | 12/1969 | Bez | 250/238 |
| 3,762,795 | 10/1973 | Bezu | 350/16 |

*Primary Examiner*—T.H. Tubbesing
*Assistant Examiner*—S. C. Buczinski
*Attorney, Agent, or Firm*—Lawrence V. Link, Jr.; W. H. MacAllister

[57] ABSTRACT

A self-stabilizing optical scanner system comprising a multi-faceted mirror formed on or attached to a gyro rotor, which is adapted for being gimbal mounted, such that as each facet is rotated through the optical path of an energy receiving lens system, a detector is optically scanned across a field of view along a first dimension. In accordance with one embodiment, each mirror facet is inclined at a different angle to the rotor spin axis such that as the rotor revolves a two-dimensional pattern is scanned; and in accordance with a second embodiment a driven mirror is disposed in the optical path of the received energy so as to provide scanning along the second dimension.

17 Claims, 14 Drawing Figures

SELF-STABILIZING IMAGE SCANNER

BACKGROUND OF THE INVENTION

This invention relates generally to optical imaging systems and more particularly to such systems embodying self-stabilizing image scanners.

Heretofore optical imaging systems requiring space stabilization, e.g. vehicle mounted systems, have generally employed a separate gyroscopic system for stabilization. Although such systems have been satisfactory for many applications, cost and size penalties imposed by the separate stabilization system have proven to be quite significant in some applications and prohibitive in still others. For example, in airborne vehicles, space is generally at a premium; and in guided missiles, size and cost (one use systems) are both of prime importance.

A significant aspect of the subject invention relates to a feature thereof which allows a major portion of the optical scanning mechanism and the rotor of a free gyro to be combined into a single element so as to provide cost and size savings.

SUMMARY OF THE INVENTION

Therefore, it is a primary object of the subject invention to provide an improved optical imaging system.

A more particular object is to provide a self-stabilizing optical image scanner.

Another object is to provide a compact self-stabilizing optical image scanner capable of providing television type imagery data in response to received IR (Infrared) energy.

A further object is to provide a self-stabilizing optical image scanner of improved quality and high reliability, and which is sufficiently compact and inexpensive for use in applications such as missile guidance systems.

Image scanners in accordance with the subject invention provide both inertial stabilization and image scanning while enabling generation of high resolution pictorial data with a relative few detector elements. In accordance with one preferred embodiment, a multifaceted mirror is formed on or attached to a gyro rotor, which is adapted for gimbal mounting, such that as each facet is rotated through the optical path of an energy receiving lens system a detector, a detector array or a plurality of detector arrays are optically scanned across the field of view along a first dimension. In accordance with one configuration of the invention each mirror facet is inclined at a different angle to the rotor spin axis such that as the rotor revolves a two-dimensional pattern is scanned. In accordance with a second configuration, a driven mirror is disposed in the optical path of the received energy so as to provide scanning along the second dimension.

BRIEF DESCRIPTION OF THE DRAWINGS

The novel features of this invention, as well as the invention itself, will be better understood from the accompanying description taken in connection with the accompanying drawings in which like reference characters refer to like parts and in which.

DESCRIPTION OF A PREFERRED EMBODIMENT

Figure 1:
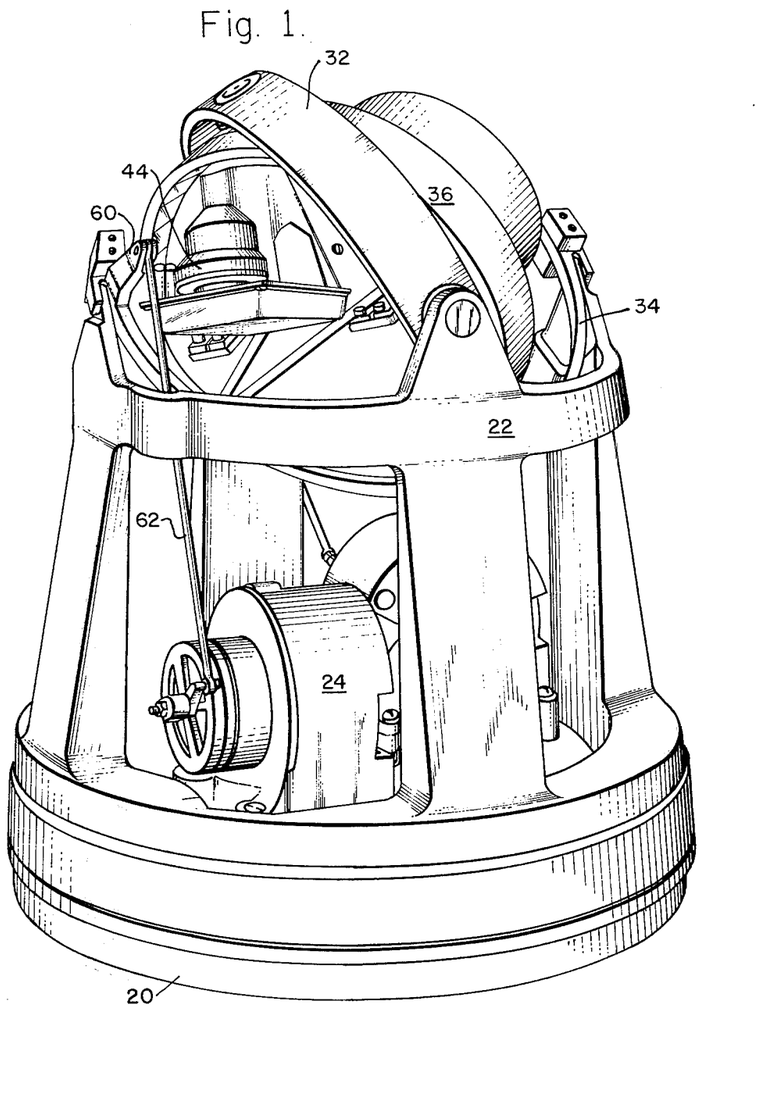
FIG. 1 is a perspective view of one preferred embodiment of a self-stabilizing image scanner in accordance with the subject invention.
Figure 2:
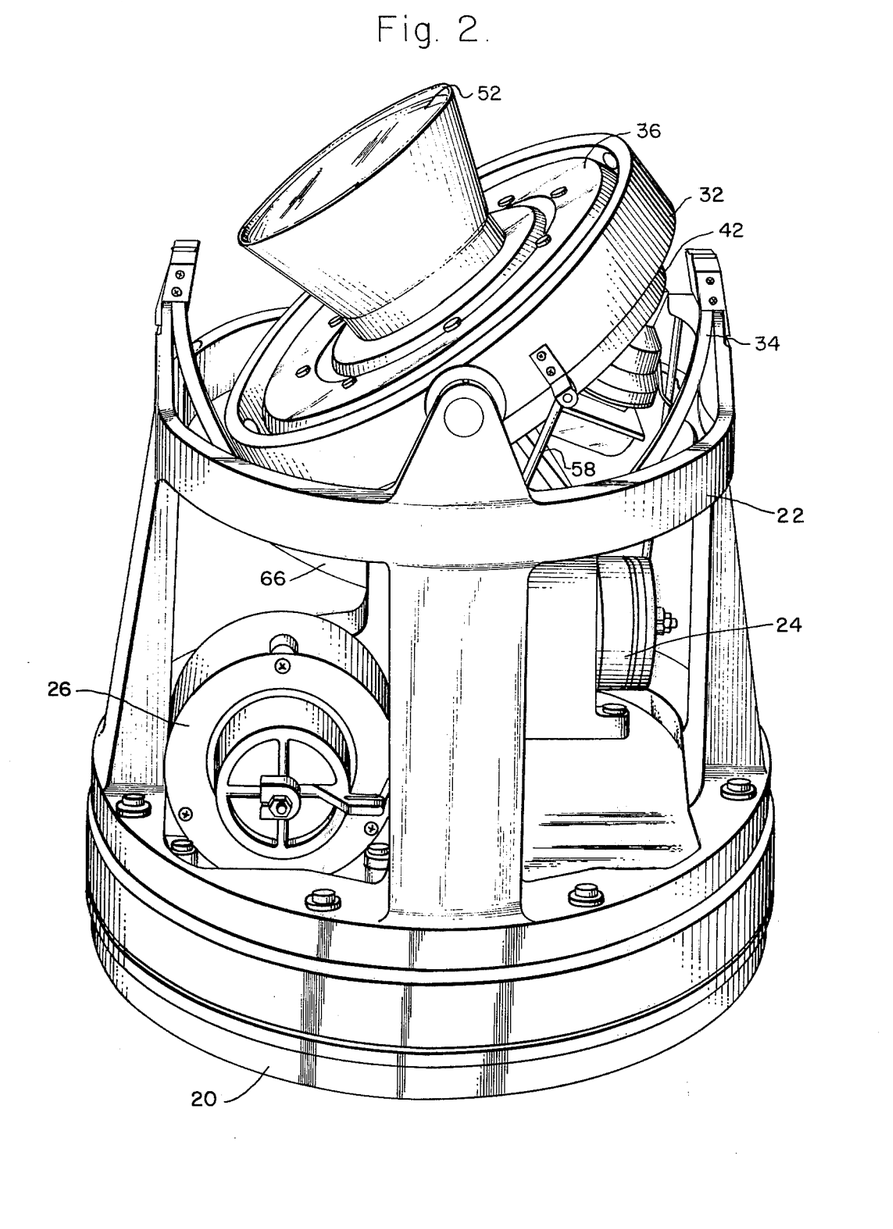
FIG. 2 is a perspective view from a second aspect angle of the self-stabilizing image scanner of FIG. 1.
Figure 3:
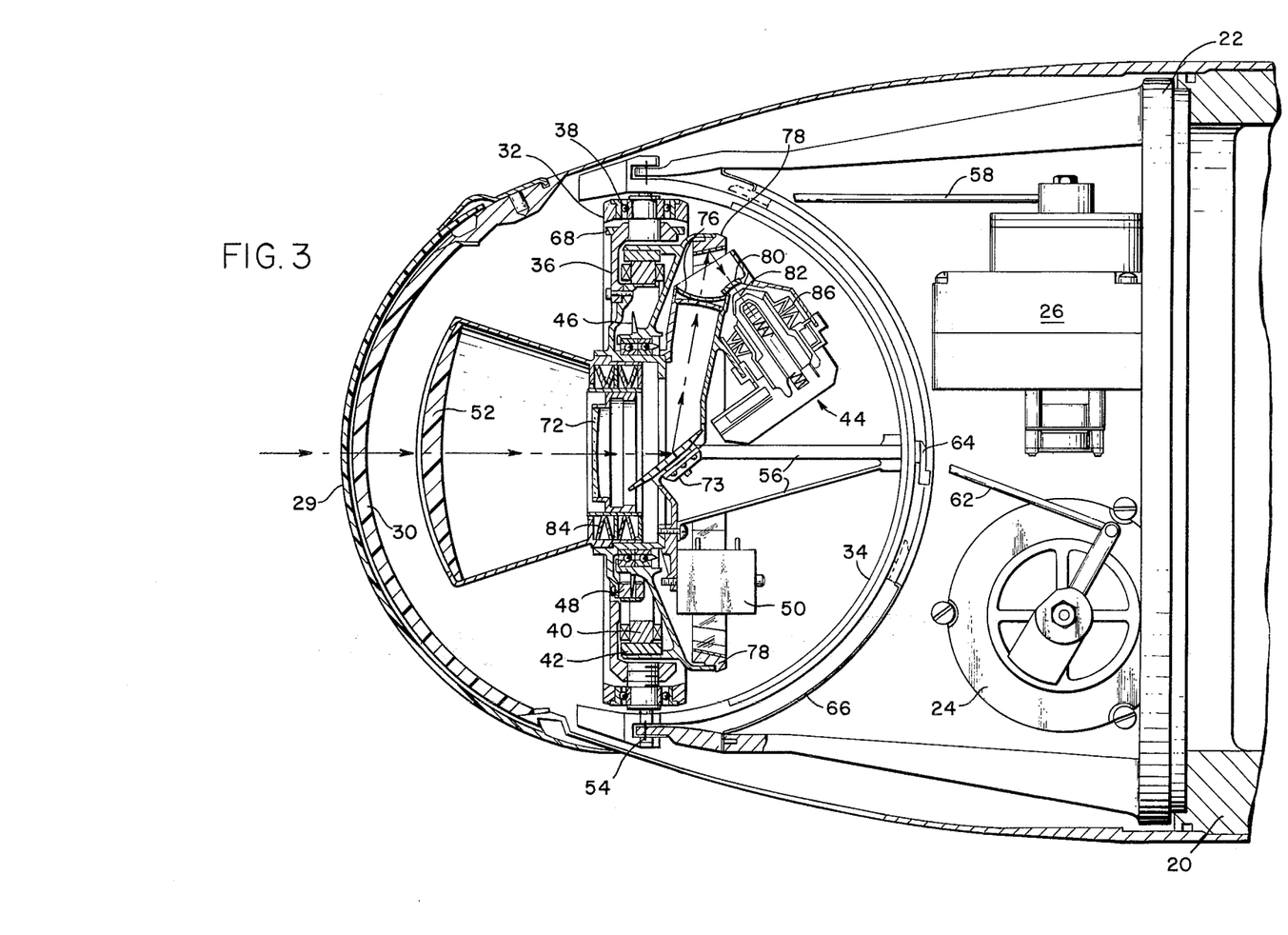
FIG. 3 is a longitudinal sectional view of the scanner shown in FIGS. 1 and 2, with the gimbals in a centered position and with a dome and dome cover installed.

Referring first primarily to FIGS. 1 through 3, the self-stabilizing image scanner thereshown includes a support bulkhead 20 which provides a mounting for a gimbal pedestal 22 and torquer assemblies 24 and 26. Support bulkhead 20 also serves as a bulkhead interface for a dome cover 29 and an IR dome 30, see FIG. 3. Pedestal structure 22 has four legs which extend forward from bulkhead 20 to accommodate outer gimbal 32 and bail 34. A pair of flanged duplex ball bearings (not shown) mount the outer gimbal between two lateral legs of pedestal 22. An inner gimbal 36 is mounted at 90° to the outer gimbal axis inside circular outer gimbal 32 by a pair of flanged duplex ball bearings 38 (FIG. 3).

The entire sensor package including a gyro stator 40 (FIG. 4) gyro rotor 42, detector/dewar/preamp assembly 44, synchronization (sync.) reticle 46, sync. generator 48, and delay line assembly 50, is assembled aligned and balanced (static and dynamic) prior to mounting to the gimbaled system. The inside diameter of inner gimbal 36 (see FIG. 4) is large enough to allow the large diameter front objective lens 52 (four inches in diameter, for example) to pass through.

Bail ring 34 is mounted between vertical legs of pedestal 22 with threaded pivot ball bearings 54. The outer races of the bearings are threaded into the bail and preloaded to reduce the radial play of the bail. The bail is independently balanced about the inner gimbal axis to reduce drift torques caused by g-sensitive unbalance. A tripod structure 56 protrudes from the rear of the inner gimbal and connects to the bail ring 34 through a pair of preloaded ball bearings. The outer diameter of the bearings registers inside the U-shaped bail, thus coupling the inner gimbal axis (azimuth, for example) to the bail ring while decoupling the outer gimbal axis (elevation, for example).

An inner gimbal axis push-rod 58 is attached to bail 34 by a torque arm 60 as shown best in FIG. 1. An outer gimbal push-rod 62 is connected directly to outer gimbal 32 as shown best in FIG. 2. To prevent damage to the scanner caused by inadvertent gyro tumbling, a mechanical stop is provided between a protrusion 64 on the rear of the inner gimbal bail drive structure and a thin hemispherical structure 66 attached to pedestal 22. A properly shaped hole is provided in hemispherical structure 66 to allow the desired circular look-angle capability in elevation and azimuth. Gimbal position sensors 68 and 70, which may be film-type DC potentiometers, are mounted on the inner and outer gimbal axes, respectively. Potentiometer 68 is shown in FIG. 3 and potentiometer 70 is indicated in the electrical block and schematic diagram of FIG. 11.

Figure 8:
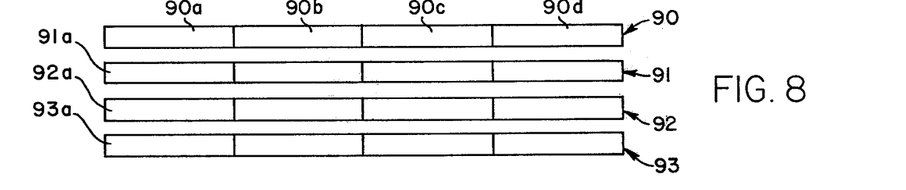
FIG. 8 is a layout diagram of detector arrays suitable for use in the image scanner of FIGS. 1 through 3.

The optical train of the subject invention includes and IR telescope which comprises objective lenses 52 and 72, folding mirror 74 and eyepiece lenses 76. The IR telescope directs received IR energy to a multi-faceted scan mirror 78 located on an internal surface of gyro rotor 42. The energy reflected from scan mirror 78 is applied through viewing lenses 80 and a dewar window 82 in detector-dewar/ preamp assembly 44 to detector arrays 88, see FIGS. 6 and 8, disposed therein.

It is noted that although the herein disclosed embodiments relate to IR image scanners, that the subject invention is applicable to optical systems in general; and as used herein the term "optical system" includes systems which respond to infrared or ultraviolet energy as well as those which respond to energy in the visible portion of the spectrum.

Thermal compensation of the IR telescope is provided by mounting the rear objective lens 72 in a temperature compensator assembly 84. Assembly 84 responds to temperature changes to move lens 72 so as to reduce focus errors due to thermally induced changes in the index of refraction and form of the lenses and in the dimensions of the supporting structures. Compensator assembly 84 is located and held by opposing spring forces of partially compressed bimetallic Belleville washers. These washers are made with opposite bimetal surfaces such that both surfaces move in the same direction with temperature changes while retaining the same holding spring force at all times.

Similarly, the optical focus in the detector image plane is maintained against thermally induced changes by temperature compensator assembly 86.

A significant aspect of the subject invention relates to the performance of space stabilization and optical scanning (at least along one scan dimension) functions by a single element. The large polar moment of inertia resulting from the rotation of gyro rotor 42 provides space stabilization for the system; and the mirror facets of scan mirror 78, the optical scan along at least one dimension. Folding mirror 73 allows the spin axis, which is the axis stabilized in direction, to be substantially coincident with the optical axis. Gyro stator 40 is adapted to be rigidly mounted to the bottom side of inner gimbal 36, see FIG. 4, and the combination of gyro stator 40 and gyro rotor 42 forms a squirrel-cage 3-phase induction type motor.

Figure 4:
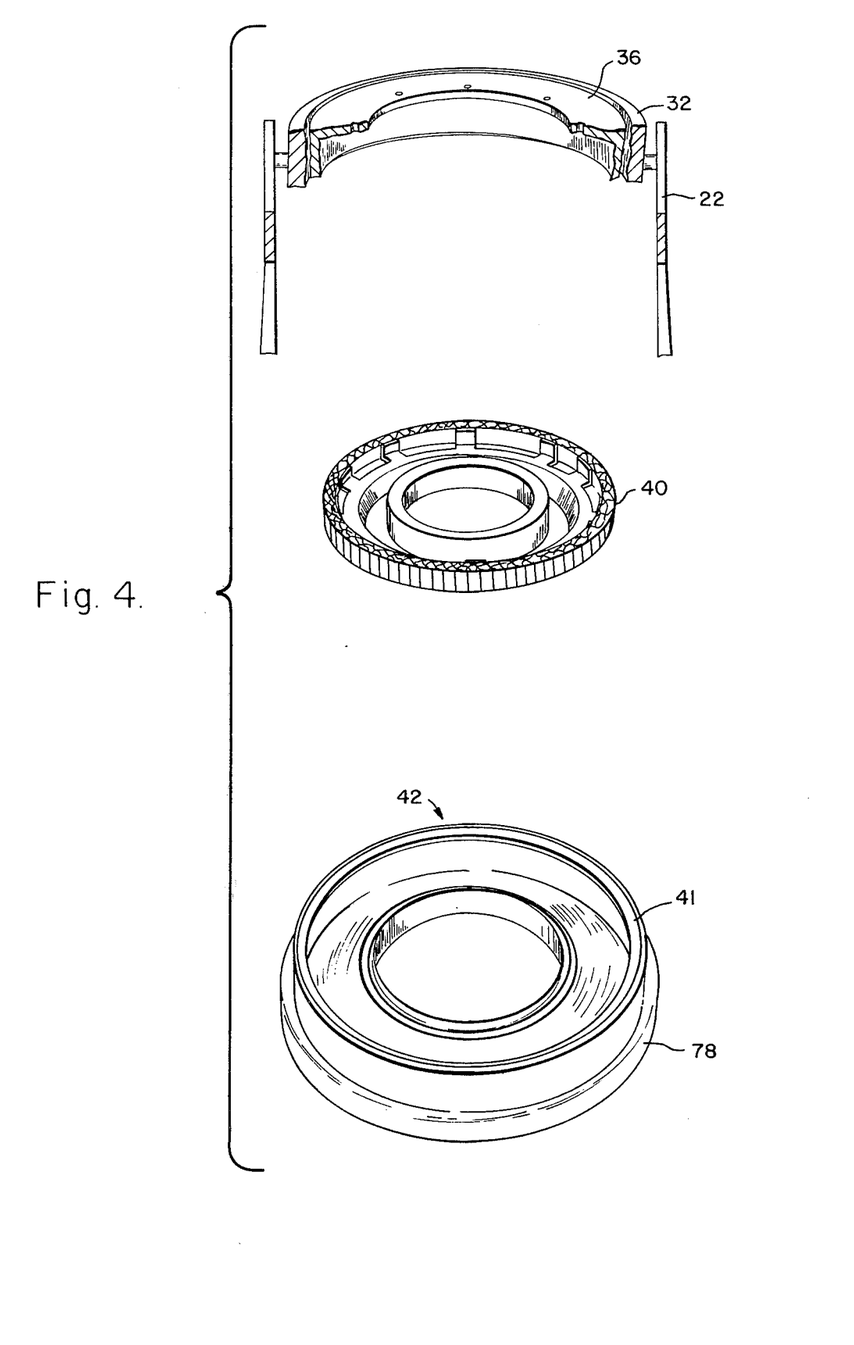
FIG. 4 is an exploded perspective view, partially cut-away, of a portion of the gimbal pedestal, the gimbals, the motor stator and the rotor/multi-faceted scan mirror assembly shown in FIGS. 1 through 3.
Figure 5:
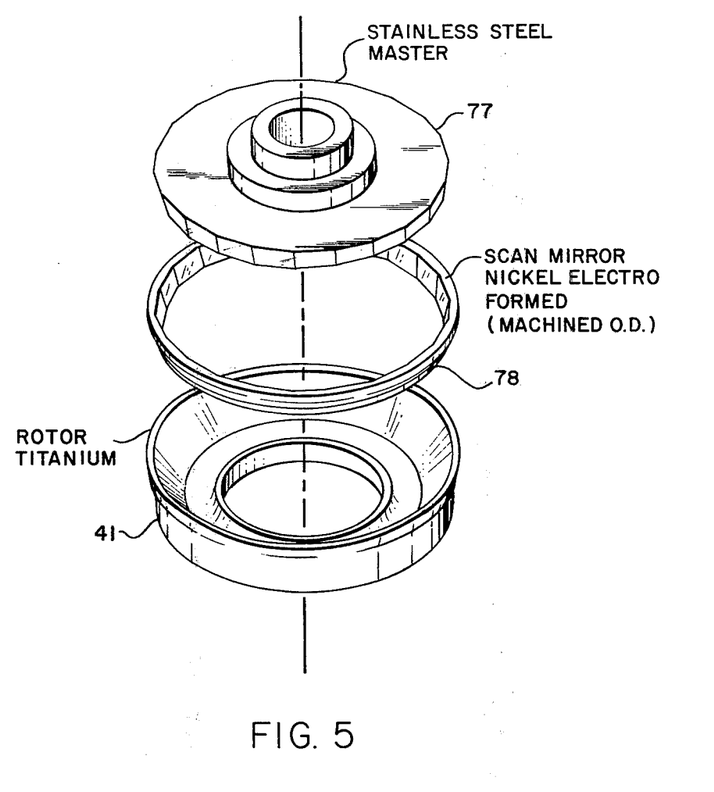
FIG. 5 is an exploded perspective top view of the rotor/multi-faceted scan mirror assembly of FIG. 4 and a perspective view of a master or mandrel useful for producing said scan mirror assembly.

Referring momentarily to FIGS. 4 and 5, the main housing 41 of gyro rotor 42 may be constructed of titanium with the scan mirror portion 78 being nickel.

One preferred method of fabricating scan mirror 78 consists of machining a metal master (or mandrel) 77, see FIG. 5, and electroforming a nickel mirror from the mandrel. This fabrication technique has proven to be cost-effective inasmuch as a plurality of scanning mirrors may be formed from a single master. For a scan mirror of the type shown in FIG. 5, which could be approximately 6.75 inches in outside diameter, there could be, for example, 20 active rectangularly-shaped mirror facets and three smaller transition zone (inactive) facets.

Figure 6:
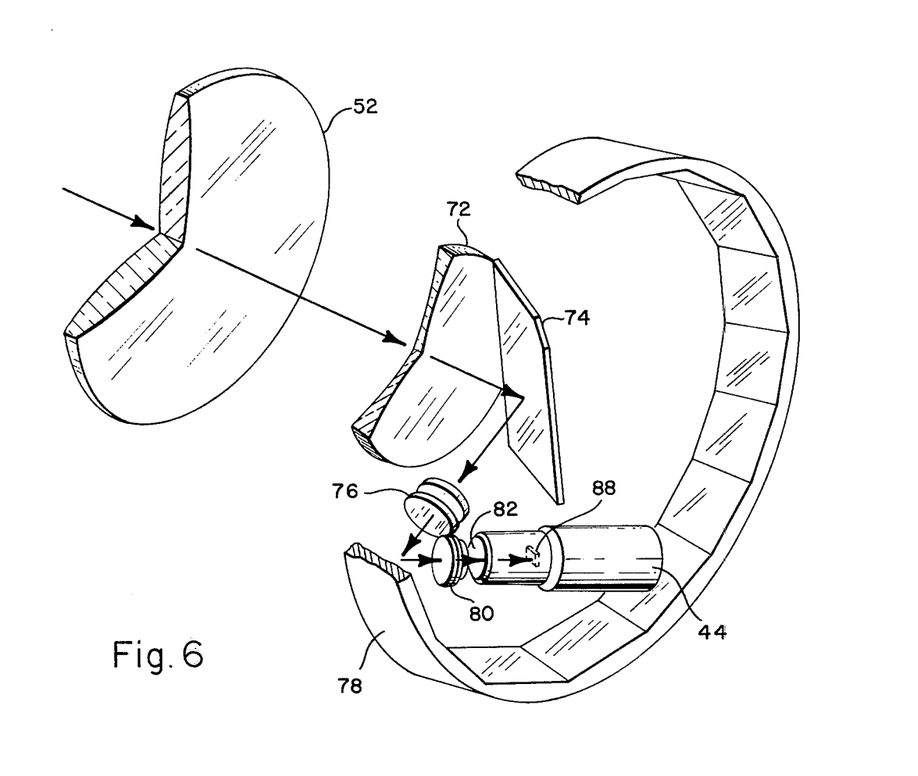
FIG. 6 is a perspective view of an optical system useful for explaining the operation of the image scanner of the subject invention.

The received optical path or train is illustrated in FIG. 6. As thereshown, received IR energy is directed by optical elements which include IR dome 30 and the telescope portion (elements 52, 72, 74 and 76) of the optical system, onto the scanning mirror 78. The energy reflected from scanning mirror 78 is directed by lenses 80 and window 82 onto the detector arrays disposed in detector/ dewar/preamp assembly 44. Scanning mirror 78 may be located at or about the exit pupil of the telescope.

Figure 7:
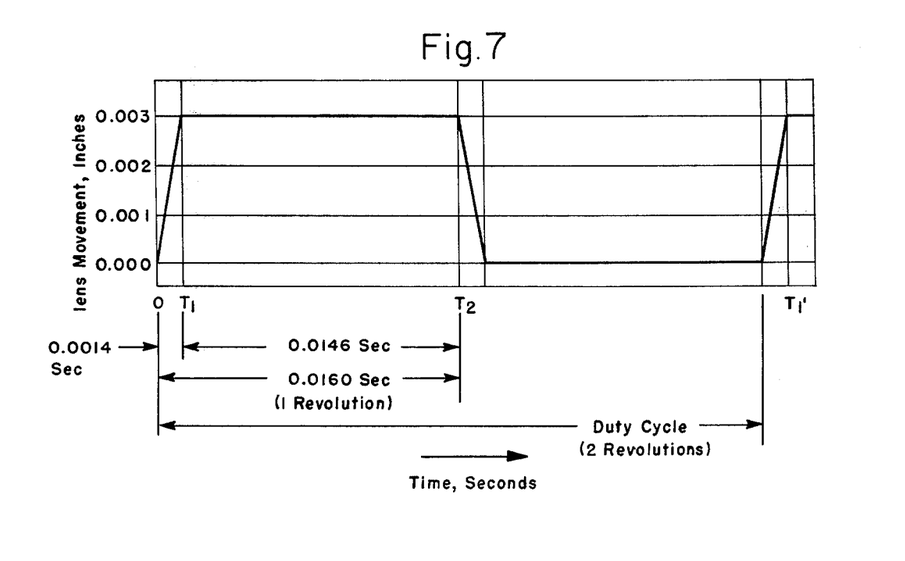
FIG. 7 is a diagram indicating the movement of the folding mirror shown in FIG. 3 as a function of time.

According to one embodiment of the subject invention, scanning along one dimension such as azimuth, for example, is provided by the rotation of the mirror facets of mirror assembly 78; and scanning along a second dimension such as elevation, for example, is provided by forming the mirror facets such that they make different angles with the spin axis of rotor 42. Two-dimensional scanning by means of a mirror drum scanner with tilted mirror faces is described in U.S. Pat. No. 3,626,091. In the embodiment of FIG. 3, interlace fields are provided by shifting the position of folding mirror 74 between fields (i.e., between revolutions of rotor 42). The displacement of folding mirror 74 by interlace actuator 73 (FIG. 3) is diagrammed in FIG. 7.

In the herein-disclosed embodiment, detector assembly 88 (FIGS. 6 and 8) comprises four detector arrays 90 through 93 oriented traversely to the direction of mechanical scan, such as the azimuth direction, for example. Each array comprising a plurality of detector elements, for example array 90 comprises elements 90a, 90b, 90c and 90d. Each detector array is similarly structured and produces one line of output video per active mirror facet, per field. Therefore, four lines of video displaced along a direction transverse to the direction of mechanical scan are produced during the period a single mirror facet passes through the path 79 (FIG. 6) of the received optical energy.

Figure 9:
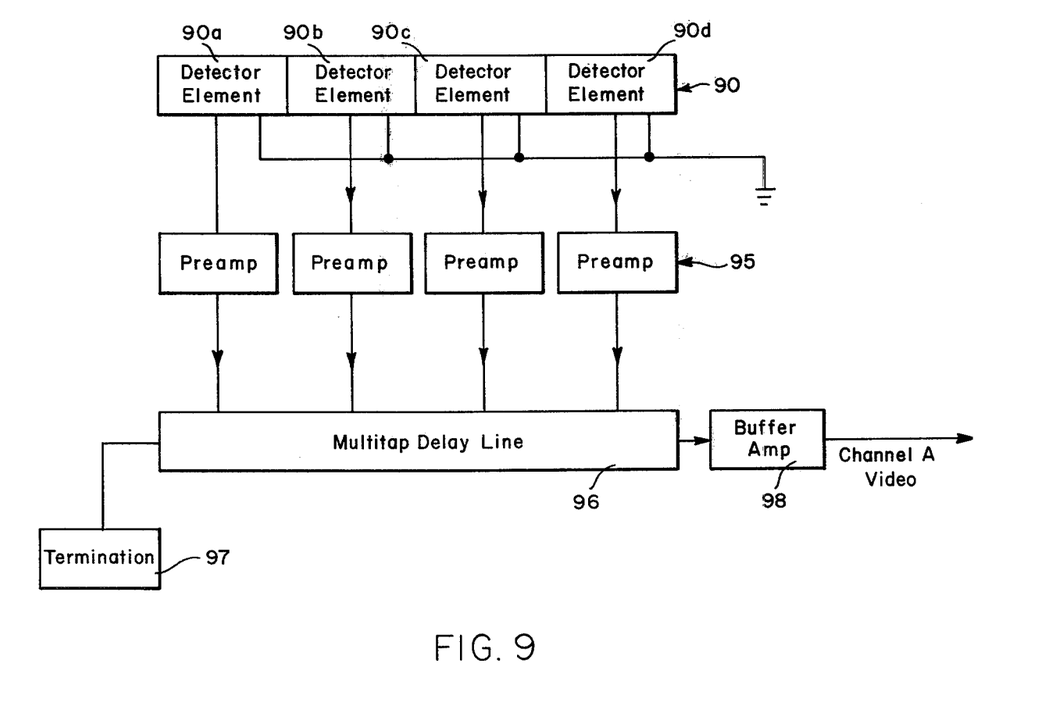
FIG. 9 is a block diagram of one detector array shown in FIG. 8, and of processing circuits associated therewith.

The processing of the signals from a single one of the detector arrays (90) is illustrated in FIG. 9. As thereshown the output signals from each detector element 90a, 90b, 90c and 90d are individually amplified in preamplifier units 95 and are processed through multiple tap delay line 96. In delay line 96, differential time delay is applied to the output signals from the various detector elements; and the combined signals are applied through a buffer amplifier 98 to a output video channel labeled channel A in FIG. 9. Buffer amplifier 98 couples signals out of the delay line while preventing undesirable signal reflections, i.e., provides isolation. A termination 97 prevents undesirable reflections from the other end of the delay line. Similarly, the output signals from arrays 91 through 93 are processed to provide video output signals for channels designated B, C, D, see FIG. 11. It is important to note that the relative time or propagation delays imposed upon the output signals from the detector elements of a single array are selected to match the azimuth mechanical scan speed with respect to the displacement of the elements along the scan direction. In this manner at the output of delay line 96 the signals originating from the same segment of the scanned field of view are combined. This type of signal processing improves the signal-to-noise ratio and a defective or faulty element does not produce a dark or missing line in the resulting display — i.e., the channels degrade gracefully. The above-summarized processing techniques and further advantages obtained therefrom are explained more fully in co-pending application serial No. 147,924 filed May 28, 1971, entitled THERMAL IMAGING SYSTEM and assigned to the assignee of the subject application.

Figure 10:
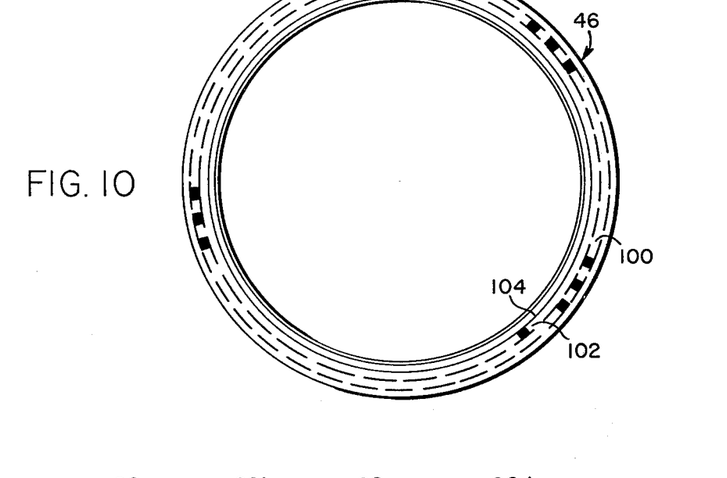
FIG. 10 is a plan view of the synchronization reticle shown in FIG. 3.

Synchronization of the display and tracking systems which may be associated with the image scanner of the subject invention is accomplished by horizontal ($H_s$) and vertical ($V_s$) sync. signals generated by electro-optical sync. generator 48 (FIG. 3) in conjunction with reticle 46. Reticle 46 is ring-mounted on the gyro rotor assembly, and it is encoded with two tracks of alternately clear and opaque spokes. As shown in FIG. 10, an outer track 100 which may have 525 spokes, for example, generates the horizontal sync. pulses; and an inner track disposed between a mounting shoulder 104 and the outer track 100 includes a single spoke for generating the vertical sync. pulses.

OPERATION

Figure 11:
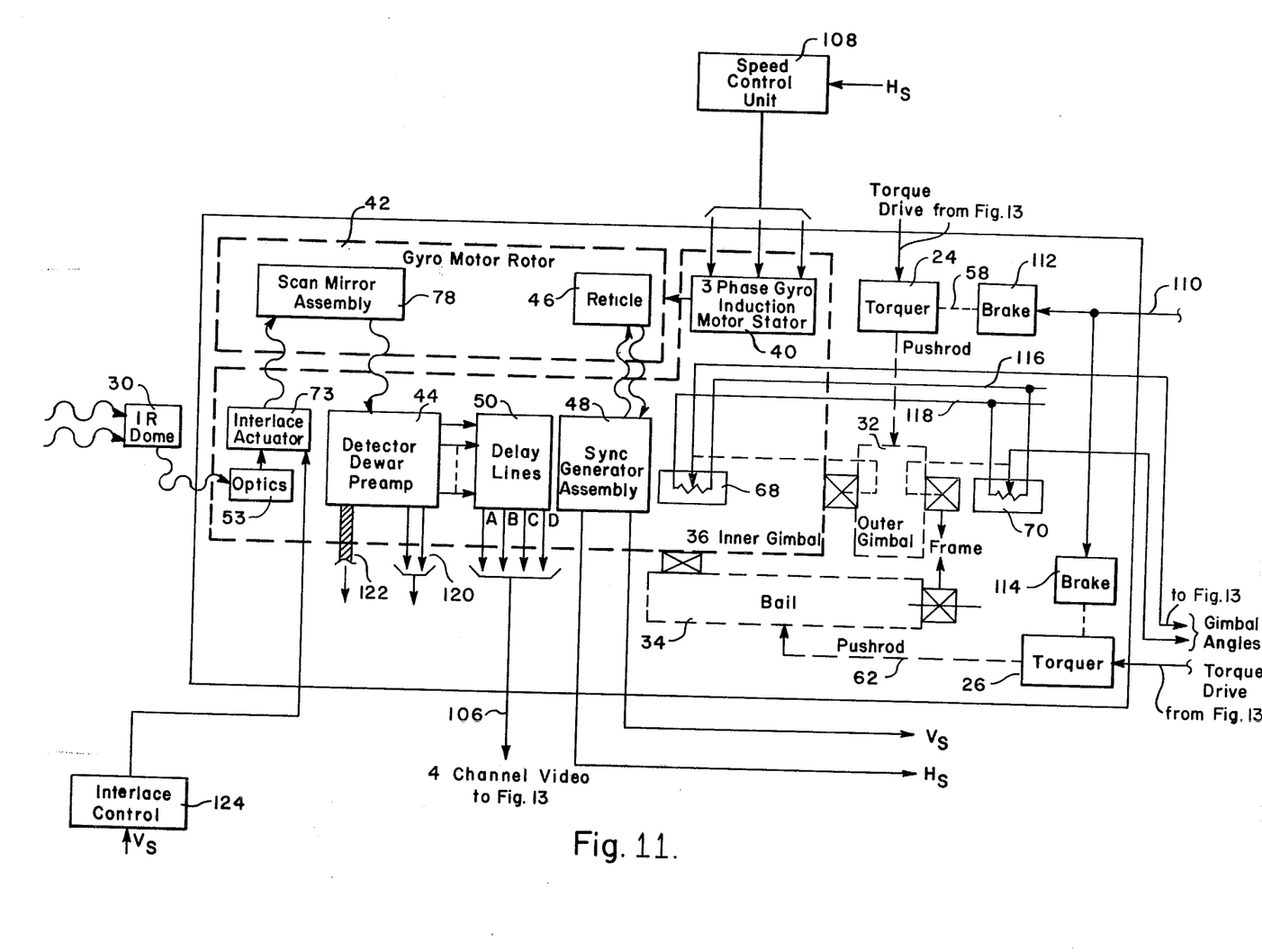
FIG. 11 is a functional block diagram of the imaging scanner of the subject invention.

For further explaining the operation of image scanners in accordance with the subject invention reference is now primarily directed to FIG. 11 which shows such an image scanner in functional block diagram form. As thereshown, received IR energy passes through dome window 30, is processed by optics, designated in FIG. 11 by reference numeral 53 and described hereinabove relative to FIG. 6. The received energy is then reflected from one of the mirror facets of scanning mirror 78 onto detector/dewar/preamp assembly 44. The output signals from each detector element of assembly 44, after being preamplified therein, are processed in the delay line unit (96 of FIG. 9) associated with the respective array unit so as to provide four parallel channels of video data on an output cable designated 106.

As described hereinabove relative to the discussion of FIG. 10, sync. reticle 46 and electro-optical sync. generator 48 provide the vertical sync. pulses ($V_s$) and horizontal sync. pulses ($H_s$).

As explained above, scanning along at least one dimension is accomplished in accordance with the subject invention by a set of plane mirror facets located on an internal surface of the spinning gyro rotor 42, see in particular FIGS. 3 and 6. As each mirror facet passes through optical path 79 (FIG. 6) of the lens system, the detector assembly 88 is optically scanned along a first dimension, azimuth for example, across a field of view. In accordance with one preferred embodiment of the invention, each facet is inclined at a different angle to the spin axis of gyro rotor 42 so as to produce stepped displacement in a dimension, elevation for example, transverse to said first dimension, from facet to facet. The sequence of facet angles is chosen to cover the elevation field of view in equal steps, once per revolution.

An example of one possible configuration of multi-faceted scan mirror 78 is an embodiment having 20 active contiguous mirror facets each subtending $2\pi/21.875$ radians. The remaining $2\pi \times 1.875/21.875$ radians coincide with the vertical retrace time and contain three smaller facets that simplify the mirror contour transition from the last to the first of the active facets. The total number of equivalent facets may be chosen to provide 525 TV lines per frame after scan conversion. Note that 525 television lines/24 = 21.875 mirror facets. The factor of 24 rises from the use of two fields per frame with four lines per facet and three TV lines per IR line. The above-described scanner supplies 80 active IR lines per field and with a 2 to 1 interlace supplies 160 active IR lines per frame.

Figure 12:
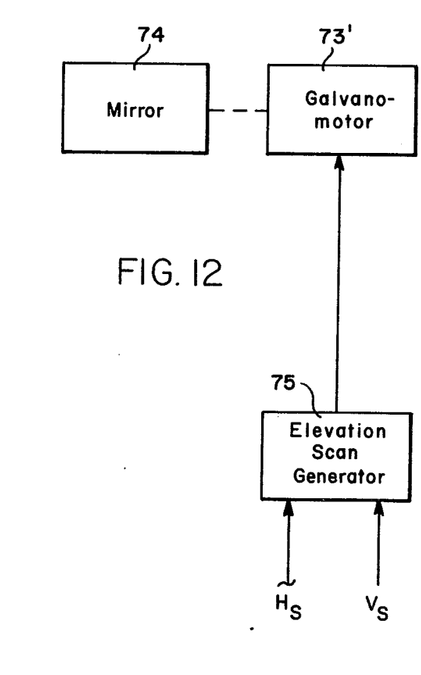
FIG. 12 is a block diagram of a second arrangement for providing image scanning along a second dimension.

In accordance with a second preferred embodiment of the subject invention, all of the mirror facets on gyro rotor 42 make the same angle with the spin axis of the rotor and scanning along a second dimension such as elevation, for example, is obtained by positioning folding mirror 74 to a plurality of discrete positions; for example, 20 such positions per field and 40 positions per frame (two interlaced fields). A functional diagram of such an elevation scanning configuration is illustrated in FIG. 12. As thereshown, an elevation scan generator 75, which is synchronized in response to horizontal and vertical sync. pulses, produces a drive current to interlace actuator 73' which may be a galvanomotor, for example. Mirror 74 is mechanically coupled to galvanomotor 73' and is thereby positioned to a new discrete angle during the scan time of each of the mirror facets of scan mirror 78. Galvanomotor 73' is well-known in the art inasmuch as the electrical-mechanical components thereof are substantially identical to a conventional galvanometer — the difference in nomenclature being derived from the function of the unit i.e., to provide a mechanical drive.

Again referring primarily to FIG. 11, three-phased power is applied to gyro stator 40 from a speed control unit 108. The speed control unit responds to the horizontal sync. pulses ($H_s$) to control the speed of rotor 42 to a preselected value, such as 3600 rpm.

During periods when the seeker is non-operational, torquers 24 and 26 are held in a rigid position by braking units 112 and 114, respectively. During periods of operation of the scanner, the brakes are deactivated (the torquers are free to be driven) by the application of an enabling signal on lead 110 from a control source (not shown).

Gimbal angle sensing potentiometers 68 and 70 are energized by the application of a supply source voltage (not shown) across leads 116 and 118.

The temperature of the detector assembly 88 (FIG. 6) is indicated by output signals on leads 120 from the assembly 44. In response to the measured temperature a cooling system (not shown) provides a coolant liquid such as liquid nitrogen, for example, through a conduit line 122 as required to maintain the desired temperature of the detector assembly.

An interlace control unit 124 applies control signals to interlace actuator 73 such that in the embodiment of FIG. 3 the folding mirror 74 is positioned to provide field-to-field scan interlace. The interlace control unit 124 is synchronized by the vertical sync. pulses ($V_s$). In the embodiment of FIG. 12, field-to-field interlace scan, as well as the total or part of the elevation seen, is provided by elevation scan generator 75.

Figure 13:
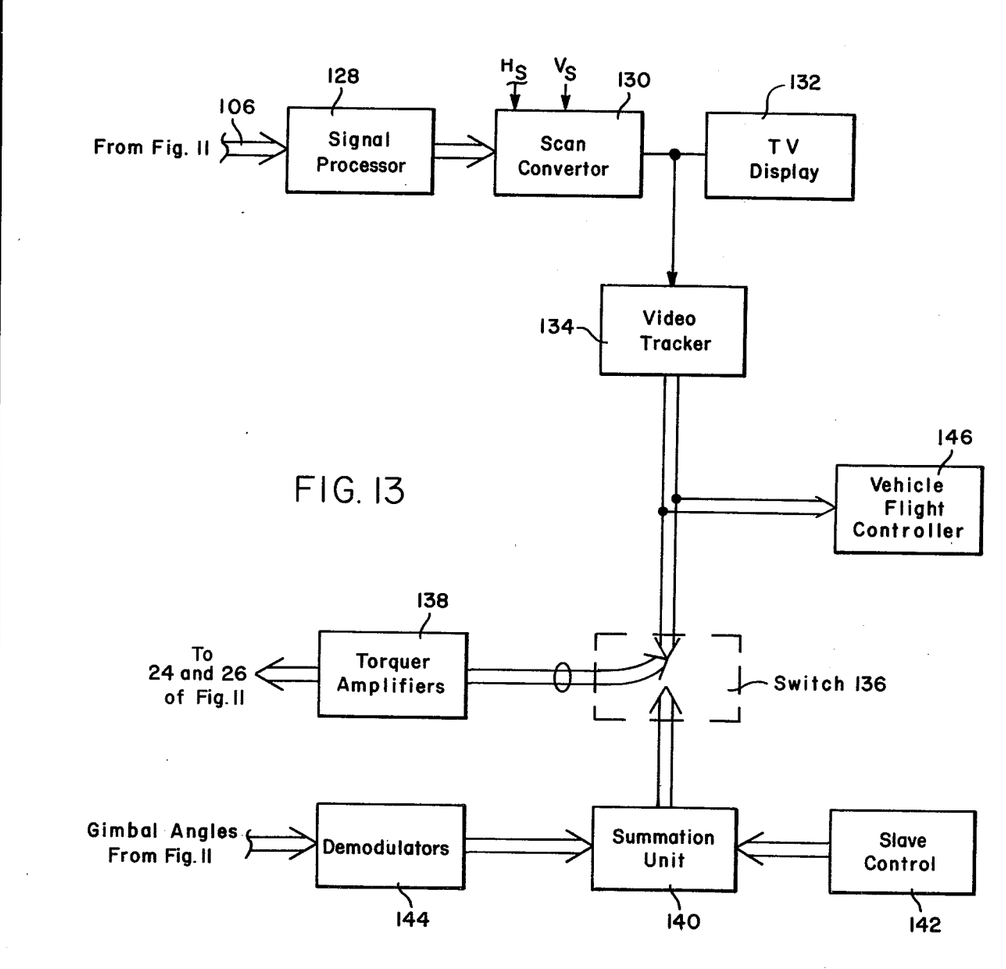
FIG. 13 is a block diagram of an imaging seeker system suitable for use with image scanners in accordance with the subject invention.

A missile seeker system suitable for using an image scanner in accordance with the subject invention is shown in block diagram form in FIG. 13. It is noted that the system of FIG. 13 is not part of the invention claimed herein, but is presented to illustrate one possible application for the invention. As shown in FIG. 13, the four channels of video data from delay lines 50 (FIG. 11) are applied on a cable 106 to a signal processor 128. Processor 128 provides conventional signal processing and then applies the four channels of data in parallel to a scan convertor unit 130. Scan convertor unit 130 converts the data applied thereto (four parallel channels in the time frame of the image scanner) to output data in conventional television video format. The output signals from convertor 130 are applied to a television display unit 132 and to a video tracker unit 134.

The tracker 134 may be of any suitable type such as that disclosed in U.S. Pat. No. 3,586,770. Tracker 134 processes the applied data so as to produce output signals (steering signals) indicative of the displacement of a designated target from the center of the scanned field of view.

During a track mode of operation, the steering command signals are applied through track/slave switch 136 to torquer amplifiers 138. Torquer amplifiers 138 apply the required signals to torquers 24 and 26, see FIGS. 1 through 3, such that the image scanner is positioned (gyro is precessed) to maintain the designated target at the approximate center of the field of view.

During an acquisition mode of operation, switch 136 is in the opposite position from that shown in FIG. 13 and the torquer amplifiers are controlled by the output signals from a summation unit 140. One input signal to summation unit 140 is a command signal applied from slave control unit 142 and a second input signal is the output from demodulators 144. The output signals from demodulators 144 are indicative of the gimbal angles of the seeker and any difference between the command position indicated from unit 142 and the actual gimbal angles of the seekers is used to produce drive signals, through switch 136 and torquer amplifiers 138, which position the gimbals to the commanded position.

It is noted that in the interest of clarity a single-dual control channel is illustrated in FIG. 13; but it is understood that two separate channels, one for the inner and one for the outer gimbals, are implemented.

The steering command signals from the video tracker 134 are also applied to a vehicle flight controller unit 146, which in response thereto positions the control surfaces of a missile, for example, such that its flight path is adjusted to null the steering command signals i.e., so that its flight path will intercept the target.

It is noted that suitable implementations for and more detailed descriptions of tracker 134 and vehicle flight controller 146 are presented in the above-cited U.S. Pat. No. 3,586,770.

Figure 14:
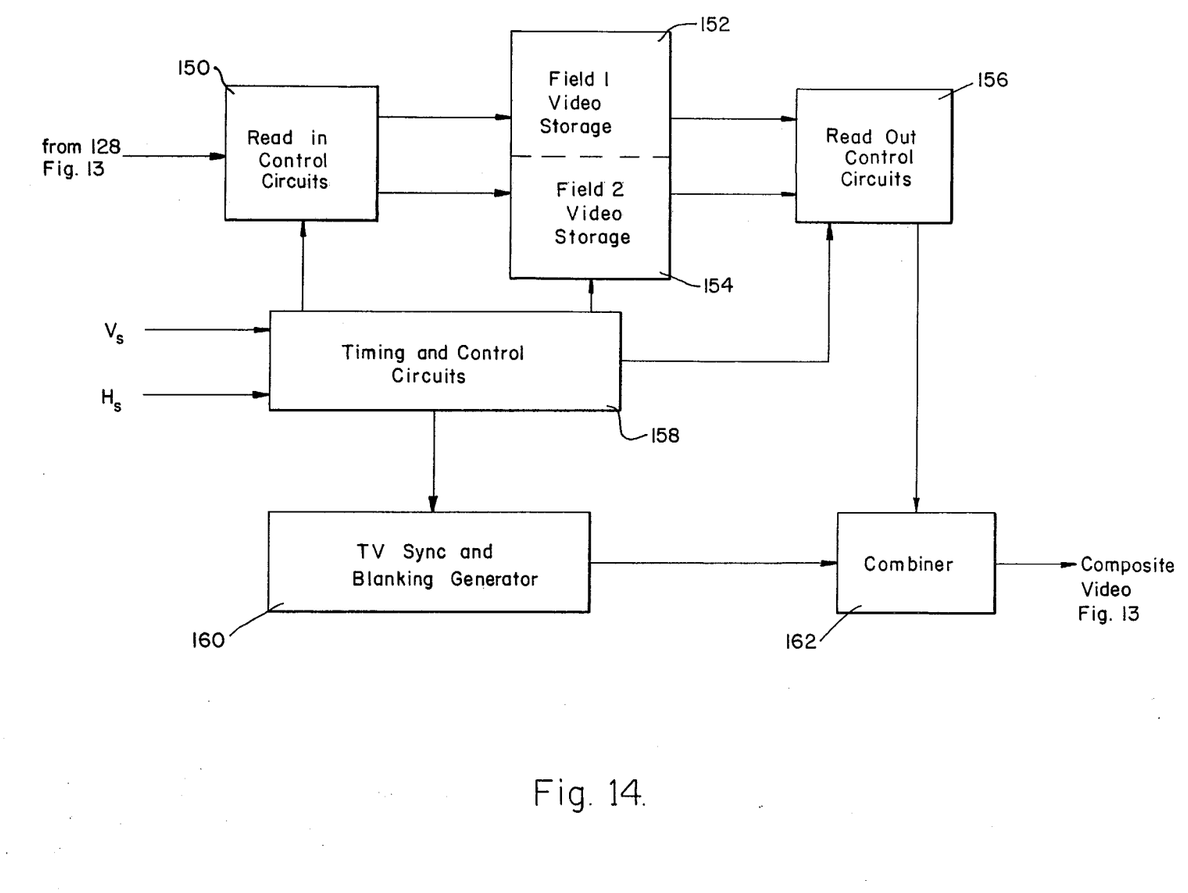
FIG. 14 is a block diagram of one embodiment of a scan converter suitable for use in the system of FIG. 13.

Scan convertor 130 (FIG. 13) may be any suitable unit for transforming the four parallel channels of IR video into a single channel of composite TV video for display on a standard TV monitor, and for use by video tracker 134. One suitable implementation is generally shown in FIG. 14 as comprising read-in control circuits 150, field No. 1 video storage unit 152, field No. 2 video storage unit 154 and read-out control circuits 156. Units 150 and 152 and 156 are controlled and synchronized in response to output signals from timing and control circuits 158 which themselves are synchronized by the horizontal and vertical sync. pulses provided by the image scanner of the invention. In response to the output signals from circuits 158, the read-in control circuits 150 apply the four video channels of data produced by the scanner to one of the storage units 152 or 154; and read-out control circuit 156 reads the data which was previously stored in the other storage unit 154 or 152 in a conventional 525 line television format. Timing and control circuits 158 also synchronize TV sync. and blanking generator 160 and the output signal therefrom is combined with the video data from unit 156 in a combiner 162. The composite television video and sync. signals from combiner 160 are applied to TV display 132 and video tracker 134 of FIG. 13.

Thus there has been herein described a new and useful image scanner wherein spatial stabilization is obtained by having the scanning and detector elements as an integral part of a two degree of freedom gyro assembly.

In order to provide full and complete disclosure, the preferred embodiments have been described herein with particularity; however, it is understood that many variations and modifications thereto may be readily implemented by those skilled in the art without departing from the scope of the subject invention. For example, although in the preferred embodiment the detector assembly was disposed on the inner gimbal, in certain implementations the detector assembly may be ungimbaled and located at the gimbal center. Such an arrangement although resulting in a certain amount of defocusing at the ends of the array could be acceptable in many applications. Also, it is noted that although the preferred optics and detector arrangements of the disclosed embodiments were specified in detail herein, that any suitable optics and detector configurations may be utilized in accordance with the invention. For example the optical and rotor spin axes need not coincide. Further, certain of the lens arrangements could be replaced by concave or convex mirrors; and the folding mirror could be a deviating prism — i.e., a refractive rather than reflective configuration.

Thus having described a new and useful self-stabilizing optical image scanner, what is claimed is.

1. A scanner adapted for being gimbal mounted, for providing electrical signals representative of the relative energy distribution within a field of view encompassing an optical axis, said scanner comprising:
 a gyroscope adapted for being gimbal mounted, said gyroscope having a rotor;
 a multi-faceted scan mirror disposed for rotation with said rotor, said multi-faceted scan mirror having mirror facets which make various angles with the spin axis of said rotor;
 first optical means for directing energy received from said field of view to said multi-faceted scan mirror whereby as said rotor revolves the field of view is scanned in a two-dimensional pattern;
 detector means for providing electrical signals representative of the relative intensity of energy applied thereto; and
 second optical means for directing energy reflected from said multi-faceted scan mirror to said detector means;
 whereby as said rotor revolves said detector means provides electrical signals representative of the relative energy distribution along at least one dimension of said field of view.

2. A scanner adapted for being gimbal mounted, for providing electrical signals representative of the relative energy distribution within a field of view encompassing an optical axis, said scanner comprising:

a gyroscope adapted for being gimbal mounted, said gyroscope having a rotor;

a multi-faceted scan mirror disposed for rotation with said rotor;

first optical means for directing energy received from said field of view to said multi-faceted scan mirror such that said optical axis is substantially coincident with the spin axis of said rotor;

detector means for providing electrical signals representative of the relative intensity of energy applied thereto; and second optical means for directing energy reflected from said multi-faceted scan mirror to said detector means;

whereby as said rotor revolves said detector means provides electrical signals representative of the relative energy distribution along at least one dimension of said field of view.

3. A scanner adapted for being gimbal mounted, for providing electrical signals representative of the relative energy distribution within a field of view encompassing an optical axis, said scanner comprising:

a gyroscope adapted for being gimbal mounted, said gyroscope having a rotor, and said rotor carrying a multi-faceted scan mirror having mirror facets which make various angles with the spin axis of said rotor;

optical means for directing energy received from said field of view to said multi-faceted scan mirror whereby as said rotor revolves the field of view is scanned in a two-dimensional pattern;

detector means disposed to intercept a portion of the energy reflected from said multi-faceted scan mirror, for providing electrical signals representative of the relative intensity of said intercepted energy;

whereby as said rotor revolves said detector means provides electrical signals representative of the relative energy distribution along at least one dimension of said field of view.

4. A scanner adapted for being gimbal mounted, for providing electrical signals representative of the relative energy distribution within a field of view encompassing an optical axis, said scanner comprising:

a gyroscope adapted for being gimbal mounted, said gyroscope having a rotor, and said rotor carrying a multi-faceted scan mirror;

optical means for directing energy received from said field of view to said multi-faceted scan mirror;

a mirror element disposed in the path of said received energy;

means for positioning said mirror element such that it occupies different positions during periods different ones of said mirror facets are illuminated by said received energy, whereby the field of view is scanned in a two-dimensional pattern; and detector means disposed to intercept a portion of the energy reflected from said multi-faceted scan mirror, for providing electrical signals representative of the relative intensity of said intercepted energy;

whereby as said rotor revolves said detector means provides electrical signals representative of the relative energy distribution along at least one dimension of said field of view.

5. A scanner adapted for being gimbal mounted, for providing electrical signals representative of the relative energy distribution within a field of view encompassing an optical axis, said scanner comprising:

a gyroscope adapted for being gimbal mounted, said gyroscope having a rotor, and said rotor carrying a multi-faceted scan mirror;

optical means for directing energy received from said field of view to said multi-faceted scan mirror;

a mirror element disposed in the path of the received energy;

means for positioning said mirror element such that it occupies different positions during different revolution cycles of said rotor so as to cause interlaced fields of said field of view to be scanned; and detector means disposed to intercept a portion of the energy reflected from said multi-faceted scan mirror, for providing electrical signals representative of the relative intensity of said intercepted energy;

whereby as said rotor revolves said detector means provides electrical signals representative of the relative energy distribution along at least one dimension of said field of view.

6. A self-stabilizing scanner for providing electrical signals representative of the relative energy distribution within a field of view encompassing an optical axis, said scanner comprising:

a gimbal assembly;

a gyroscope mounted on said gimbal assembly, said gyroscope having a rotor;

a multi-faceted scan mirror disposed for rotation with said rotor; said multi-faceted scan mirror having mirror facets which make various angles with the spin axis of said rotor;

first optical means for directing energy received from said field of view to said multi-faceted scan mirror, whereby as said rotor revolves the field of view is scanned in a two-dimensional pattern;

detector means for providing electrical signals representative of the relative intensity of energy applied thereto; and second optical means for directing energy reflected from said multi-faceted scan mirror to said detector means;

whereby as said rotor revolves stabilization of said optical axis is provided and said detector means provides electrical signals representative of the relative energy distribution along at least one dimension of said field of view.

7. The self-stabilizing scanner of claim 6 including a mirror element disposed in the path of the received energy; and means for positioning said mirror element such that it occupies different positions during different revolution cycles of said rotor so as to cause interlaced fields of said field of view to be scanned.

8. A self-stabilizing scanner for providing electrical signals representative of the relative energy distribution within a field of view encompassing an optical axis, said scanner comprising:

a gimbal assembly;

a gyroscope mounted on said gimbal assembly, said gyroscope having a rotor;

a multi-faceted scan mirror disposed for rotation with said rotor;

first optical means for directing energy received from said field of view to said multi-faceted scan mirror;

a mirror element disposed in the path of said received energy;

means for positioning said mirror elements such that is occupies different positions during periods different ones of said mirror facets are illuminated by said received energy, whereby the field of view is scanned in a two-dimensional pattern;

detector means for providing electrical signals representative of the relative intensity of energy applied thereto; and second optical means for directing energy reflected from said multi-faceted scan mirror to said detector means;

whereby as said rotor revolves stabilization of said optical axis is provided and said detector means provides electrical signals representative of the relative energy distribution along at least one dimension of said field of view.

9. A self-stabilizing scanner for providing electrical signals representative of the relative energy distribution within a field of view encompassing an optical axis, said scanner comprising:

a gimbal assembly having a gimbal support structure, and an inner gimbal and an outer gimbal mounted on said support structure such that said inner gimbal has at least two degrees of freedom of movement;

a gyroscope mounted on said gimbal assembly, said gyroscope having a rotor;

a multi-faceted scan mirror disposed for rotation with said rotor;

first optical means for directing energy received from said field of view to said multi-faceted scan mirror, said first optical means being mounted on said inner gimbal so as to cause said optical axis to be substantially coincident with the spin axis of said rotor;

detector means for providing electrical signals representative of the relative intensity of energy applied thereto; and second optical means for directing energy reflected from said multi-faceted scan mirror to said detector means;

whereby as said rotor revolves stabilization of said optical axis is provided and said detector means provides electrical signals representative of the relative energy distribution along at least one dimension of said field of view.

10. A self-stabilizing scanner for providing electrical signals representative of the relative energy distribution within a field of view encompassing an optical axis, said scanner comprising:

a gimbal assembly;

a gyroscope mounted on said gimbal assembly, said gyroscope having a rotor;

a multi-faceted scan mirror disposed for rotation with said rotor;

first optical means for directing energy received from said field of view to said multi-faceted scan mirror said first optical means including temperature compensator means for reducing focus errors due to temperature changes;

detector means for providing electrical signals representative of the relative intensity of energy applied thereto; and second optical means for directing energy reflected from said multi-faceted scan mirror to said detector means;

whereby as said rotor revolves stabilization of said optical axis is provided and said detector means provides electrical signals representative of the relative energy distribution along at least one dimension of said field of view.

11. The self-stabilizing image scanner of claim 10 wherein said second optical means includes temperature compensator means for reducing focus errors due to temperature changes.

12. A self-stabilizing scanner for providing electrical signals representative of the relative energy distribution within a field of view encompassing an optical axis, said scanner comprising:

a gimbal assembly;

a gyroscope mounted on said gimbal assembly, said gyroscope having a rotor, and said rotor carrying a multifaceted scan mirror having mirror facets which make various angles with the spin axis of said rotor;

optical means for directing energy received from said field of view to said multi-faceted scan mirror whereby as said rotor revolves the field of view is scanned in a two-dimensional pattern;

detector means disposed to intercept a portion of the energy reflected from said multi-faceted scan mirror, for providing electrical signals representative of the relative intensity of said intercepted energy;

whereby as said rotor revolves stabilization of said optical axis is provided and said detector means provides electrical signals representative of the relative energy distribution along at least one dimension of said field of view.

13. A self-stabilizing scanner for providing electrical signals representative of the relative energy distribution within a field of view encompassing an optical axis, said scanner comprising:

a gimbal assembly;

a gyroscope mounted on said gimbal assembly, said gyroscope having a rotor, and said rotor carrying a multi-faceted scan mirror;

optical means for directing energy received from said field of view to said multi-faceted scan mirror;

a mirror element disposed in the path of said received energy;

means for positioning said mirror element such that it occupies different positions during periods different ones of said mirror facets are illuminated by said received energy, whereby the field of view is scanned in a two-dimensional pattern; and detector means disposed to intercept a portion of the energy reflected from said multi-faceted scan mirror, for providing electrical signals representative of the relative intensity of said intercepted energy;

whereby as said rotor revolves stabilization of said optical axis is provided and said detector means provides electrical signals representative of the relative energy distribution along at least one dimension of said field of view.

14. A self-stabilizing scanner for providing electrical signals representative of the relative energy distribution within a field of view encompassing an optical axis, said scanner comprising:

a gimbal assembly having a gimbal support structure, and an inner gimbal and an outer gimbal mounted on said support structure such that said inner gimbal has at least two degrees of freedom of movement;

a gyroscope mounted on said gimbal assembly, said gyroscope having a rotor, and said rotor carrying a multi-faceted scan mirror;

optical means for directing energy received from said field of view to said multi-faceted scan mirror, said optical means being mounted on said inner gimbal so as to cause said optical axis to be substantially coincident with the spin axis of said rotor; and detector means disposed to intercept a portion of the energy reflected from said multi-faceted scan mirror, for providing electrical signals representative of the relative intensity of said intercepted energy;

whereby as said rotor revolves stabilization of said optical axis is provided and said detector means provides electrical signals representative of the relative energy distribution along at least one dimension of said field of view.

15. A self-stabilizing image scanner for providing electrical signals representative of the thermal energy distribution within a field of view which emcompasses an optical axis, said image scanner comprising:

a gimbal assembly having a gimbal support structure and inner and outer gimbal members mounted on said support structure such that said inner gimbal member has two degrees of freedom of movement;

a gyroscope mounted on said inner gimbal member, said gyroscope having a stator, and a rotor adapted for rotation about said stator; said rotor carrying a multi-faceted scan mirror thereon and said mirror facets making various angles with the spin axis of said rotor;

first optical means for directing energy received from said field of view to said multi-faceted scan mirror, said first optical means being mounted on said inner gimbal so as to cause said optical axis and the spin axis of said rotor to be substantially coincident;

detector means for providing electrical signals representative of the relative intensity of thermal energy applied thereto; and second optical means for directing energy reflected from said multi-faceted scan mirror to said detector means;

whereby as said rotor revolves said detector means provides electrical output signals representative of the relative thermal energy distribution within said field of view, and the angular momentum of said rotor provides spatial stabilization of said optical axis.

16. A self-stabilizing image scanner for providing electrical signals representative of the thermal energy distribution within a field of view which encompasses an optical axis, said image scanner comprising:

a gimbal assembly having a gimbal support structure, and inner and outer gimbal members mounted on said support structure such that said inner gimbal member has two degrees of freedom of movement;

a gyroscope mounted on said inner gimbal member, said gyroscope having a stator, and a rotor adapted for rotation about said stator; said rotor carrying a multi-faceted scan mirror thereon and said mirror facets making various angles with the spin axis of said rotor;

first optical means for directing energy received from said field of view to said mutli-faceted scan mirror;

a mirror element disposed in the path of said received energy;

means for positioning said mirror elements such that it occupies different positions during different revolution cycles of said rotor so as to cause interlaced field of said field of view to be scanned;

detector means for providing electrical signals representative of the relative intensity of thermal energy applied thereto; and second optical means for directing energy reflected from said multi-faceted scan mirror to said detector means;

whereby as said rotor revolves said detector means provides electrical output signals representative of the relative thermal energy distribution within said field of view, and the angular momentum of said rotor provides spatial stabilization of said optical axis.

17. A self-stabilizing image scanner for providing electrical signals representative of the thermal energy distribution within a field of view which encompasses an optical axis, said image scanner comprising:

a gimbal assembly having a gimbal support structure, and inner and outer gimbal members mounted on said support structure such that said inner gimbal member has two degrees of freedom of movement;

a gyroscope mounted on said inner gimbal member, said gyroscope having a stator, and a rotor adapted for rotation about said stator; said rotor carrying a multi-faceted scan mirror thereon and said mirror facets making various angles with the spin axis of said rotor;

first optical means for directing energy received from said field of view to said multi-faceted scan mirror, said first optical means including temperature compensator means for reducing focus errors due to temperature changes.

detector means for providing electrical signals representative of the relative intensity of thermal energy applied thereto; and second optical means for directing energy reflected from said multi-faceted scan mirror to said detector means, said second optical means including temperature compensator means for reducing focus errors due to temperature changes;

whereby as said rotor revolves said detector means provides electrical output signals representative of the relative thermal energy distribution within said field of view, and the angular momentum of said rotor provides spatial stabilization of said optical axis.

* * * * *